United States Patent

Neuerburg et al.

Patent Number: 5,896,733
Date of Patent: Apr. 27, 1999

[54] CUTTING MACHINE

[75] Inventors: Horst Neuerburg, Saverne; Jean-Paul Lacroix, Mommenheim, both of France

[73] Assignee: Kuhn S.A., Saverne Cedex, France

[21] Appl. No.: 08/840,929

[22] Filed: Apr. 25, 1997

[30] Foreign Application Priority Data

May 2, 1996 [FR] France ................................. 96 05660

[51] Int. Cl.⁶ ................................................ A01D 34/66
[52] U.S. Cl. .................................. 56/15.2; 56/6; 56/15.8; 56/DIG. 14
[58] Field of Search ........................... 56/6, 7, 15.8, 15.9, 56/13.6, 15.1, 15.2, 16.3, DIG. 14

[56] References Cited

U.S. PATENT DOCUMENTS

| | | |
|---|---|---|
| 4,343,138 | 8/1982 | Neuerburg . |
| 4,426,828 | 1/1984 | Neuerburg . |
| 4,443,998 | 4/1984 | Neuerburg . |
| 4,452,034 | 6/1984 | Neuerburg . |
| 4,809,488 | 3/1989 | Neuerburg et al. . |
| 4,879,870 | 11/1989 | Neuerburg . |
| 4,896,493 | 1/1990 | Neuerburg . |
| 4,922,693 | 5/1990 | Neuerburg . |
| 4,970,848 | 11/1990 | Neuerburg et al. . |
| 4,999,981 | 3/1991 | Neuerburg . |
| 5,203,150 | 4/1993 | Ryken et al. .................. 56/15.9 X |
| 5,241,809 | 9/1993 | Wolff et al. . |
| 5,353,580 | 10/1994 | Wolff ................................. 56/6 X |
| 5,724,794 | 3/1998 | Wolff .................................. 56/6 |
| 5,727,371 | 3/1998 | Keiffer et al. ........................ 56/6 |

FOREIGN PATENT DOCUMENTS

| | | |
|---|---|---|
| 0 556 143 | 8/1993 | European Pat. Off. . |
| 2 357 163 | 2/1978 | France . |
| 2 687 039 | 8/1993 | France . |
| 91 12 331 | 1/1992 | Germany . |
| 41 10 430 | 10/1992 | Germany . |
| 2 157 936 | 11/1985 | United Kingdom . |

Primary Examiner—Heather Shackelford
Attorney, Agent, or Firm—Oblon, Spivak, McClelland, Maier & Neustadt, P.C.

[57] ABSTRACT

A cutting machine including a cutting mechanism which can occupy at least one work position and one set-down position; a hitching structure; a carrying beam connected on the one hand to the hitching structure by a first articulation and on the other hand to the cutting mechanism by a second articulation; a lightening device including an elastically deformable element, and a locking device intended to block the first and second articulations. In the set-down position, the hitching structure and the carrying beam are held by the elastically deformable element and the first and second articulations are locked.

14 Claims, 4 Drawing Sheets

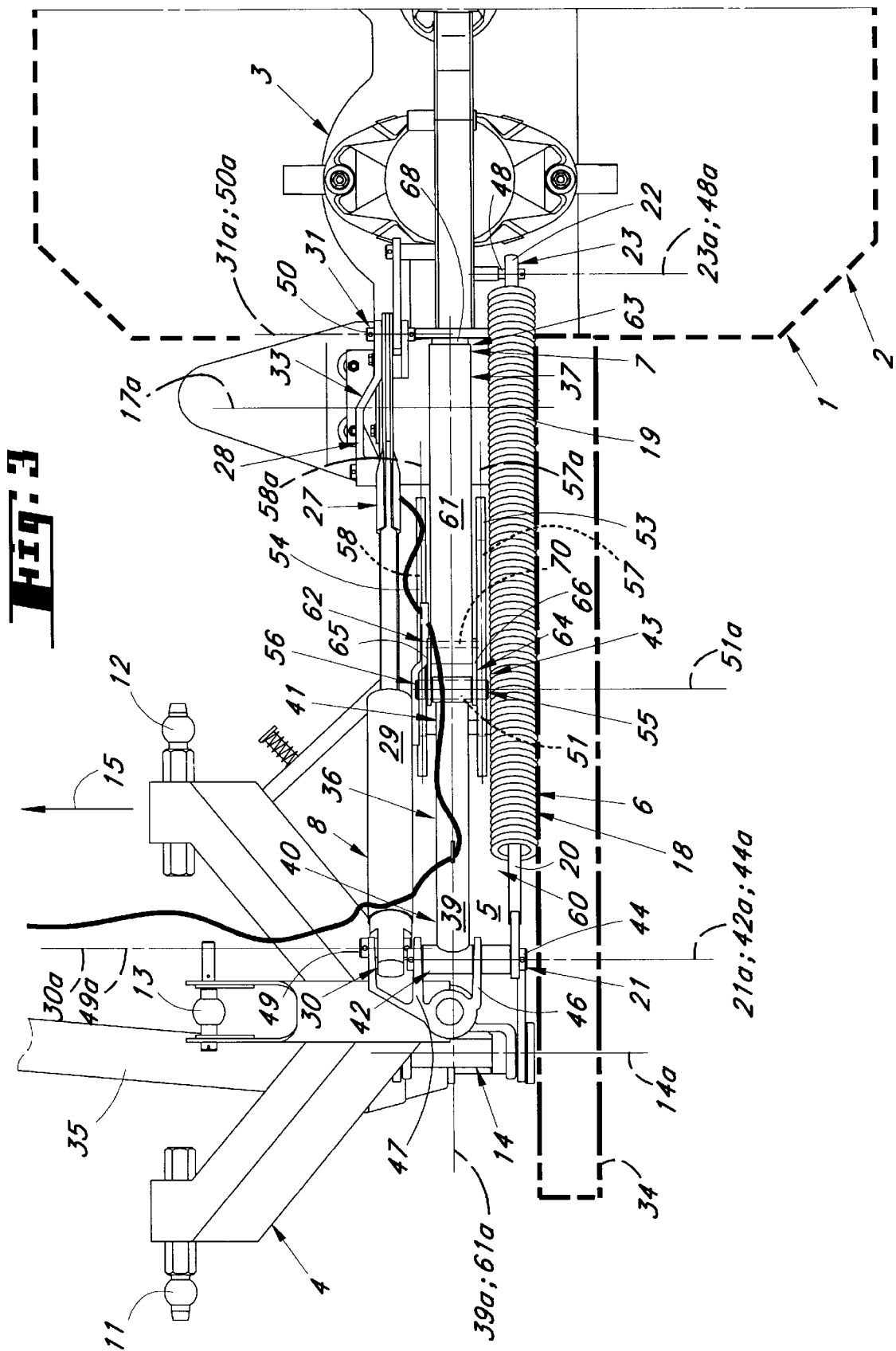

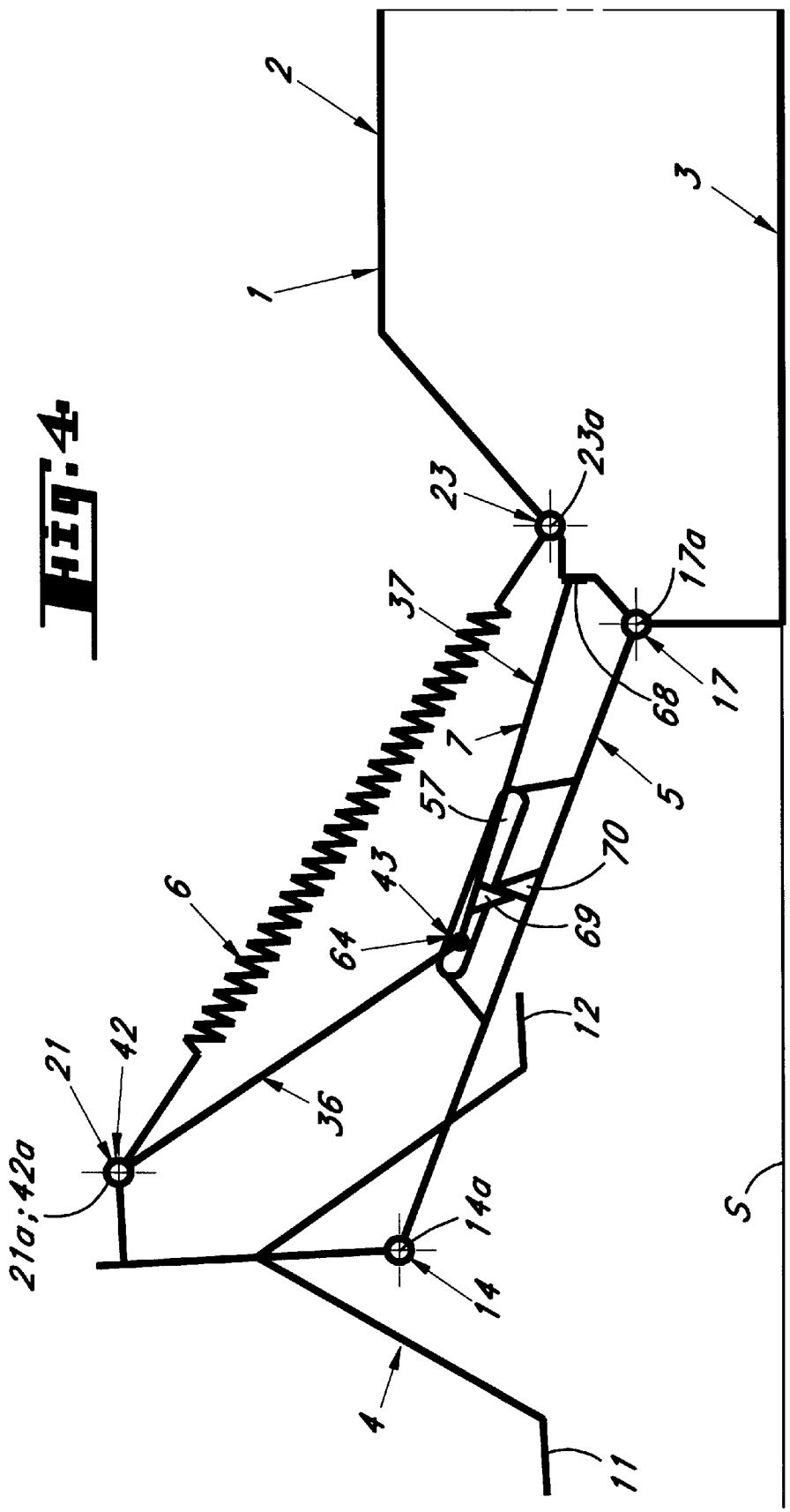

CUTTING MACHINE

BACKGROUND OF THE INVENTION

Field of the Invention

The present invention relates to a cutting machine including:
- a cutting mechanism;
- a hitching structure intended to be connected to the hitching device of a motor vehicle;
- a carrying beam connected on the one hand to the hitching structure by means of a first articulation and on the other hand to the cutting mechanism by means of a second articulation;
- a lightening device including an elastically deformable element connected on the one hand to the hitching structure by means of a third articulation and on the other hand to the cutting mechanism by means of a fourth articulation;
- a locking device intended:
  - to lock the pivoting of the hitching structure with respect to the carrying beam about the longitudinal axis of the first articulation,
  - to lock the pivoting of the cutting mechanism with respect to the carrying beam about the longitudinal axis of the second articulation.

DISCUSSION OF THE BACKGROUND

Such a cutting machine is known from document FR-A-2 687 039.

This cutting machine includes a carrying beam connected on the one hand to a hitching structure by means of a first articulation and on the other hand to a cutting mechanism by means of a second articulation. The hitching structure is intended to be connected to a motor vehicle by means of two lower hitching points and of one upper hitching point. The cutting machine also includes a lightening device intended to lighten the cutting mechanism in the work position.

This lightening device is fitted with an elastic element connected on the one hand to the hitching structure by means of a third articulation and on the other hand to the cutting mechanism by means of a fourth articulation.

This cutting machine is also equipped with a locking device making it possible, in the transport position, to lock the pivoting of the hitching structure with respect to the carrying beam and the pivoting of the cutting mechanism with respect to said carrying beam and, in the set-down position, to cancel said lockings. For this purpose, the locking device includes a limiter connected on the one hand to the hitching structure and on the other hand to the carrying beam in a sliding manner.

The limiter is equipped, at the end at which it is connected to the carrying beam, with a journal guided in oblong holes provided on said carrying beam. It is also provided with a hook connected on the one hand to the journal and intended on the other hand, in the transport position, to catch on a catching member which is rigidly fastened to the cutting mechanism.

In order to set down this known cutting machine, a stand is provided and this stand is intended, in the set-down position, to support the carrying beam and the hitching structure. For this purpose the stand is connected to the carrying beam and controlled, when desired, by means of a control device in such a way that when the latter is actuated, said stand is placed in the set-down position and the action of the lightening device is cancelled.

SUMMARY OF THE INVENTION

The object of the present invention is to simplify the means allowing the cutting machine to be set down while guaranteeing easy hitching of said cutting machine to the motor vehicle.

For this purpose, provision is made on the cutting machine according to the invention that, in the set-down position, the hitching structure and the carrying beam are held by means of the elastically deformable element of the lightening device and that the locking device blocks, at least in one direction:
- the pivoting of the hitching structure with respect to the carrying beam about the longitudinal axis of the first articulation, and
- the pivoting of the carrying beam with respect to the cutting mechanism about the longitudinal axis of the second articulation.

Such a cutting machine is easy to set down and to hitch to a motor vehicle. It will be observed that such a cutting machine has no stand to have to be put in place for setting down said cutting machine.

The invention also relates to the following features taken separately or in any technically possible combination:
- the locking device includes a limiter intended to limit the pivoting of the hitching structure with respect to the carrying beam about the longitudinal axis of the first articulation;
- the limiter is connected, at one of its ends, to the hitching structure by means of a seventh articulation and, at the other of its ends, to the carrying beam in a sliding manner by means of a connection including a journal of longitudinal axis at least substantially parallel to the longitudinal axis of the first articulation, which journal is guided in at least one oblong hole lying at least substantially near the middle part of said carrying beam;
- there are provided two oblong holes in which the ends of the journal are guided, and the longitudinal axis of each oblong hole extends at least substantially at right angles to the longitudinal axis of the first articulation;
- the locking device includes a latch intended simultaneously to lock the pivoting of the hitching structure with respect to the carrying beam about the longitudinal axis of the first articulation and the pivoting of the carrying beam with respect to the cutting mechanism about the longitudinal axis of the second articulation; such a latch makes it possible, with a single manual action, to place the cutting machine in a set-down position in order to set it down;
- the latch includes a lever connected, at one of its ends, to the limiter by means of an eighth articulation of longitudinal axis coincident with the longitudinal axis of the journal;
- the lever includes a first bearing surface at its other end and a second bearing surface situated between this first bearing surface and the eighth articulation;
- in the set-down position, the first bearing surface of the lever bears on the cutting mechanism, in so doing, the upward pivoting of the carrying beam, that is to say the pivoting in the clockwise direction about the longitudinal axis of the second articulation, is blocked;
- in the set-down position, the second bearing surface of the lever bears against a stop provided on the carrying beam; in so doing, the pivoting of the hitching structure toward the cutting mechanism, that is to say in the clockwise direction about the longitudinal axis of the first articulation, is blocked;

said stop provided on the carrying beam is situated between the two oblong holes in which the journal is guided;

in the set-down position, in order to adjust the position of the hitching structure, provision is made for:
the limiter to be of adjustable length and/or
the lever to be of adjustable length and/or
the second bearing surface to be adjustable and/or
the stop to be adjustable;

in a position other than the set-down position, the lever is retracted in such a way as to allow, on the one hand, the carrying beam to pivot with respect to the hitching structure about the longitudinal axis of the first articulation and, on the other hand, the cutting mechanism to pivot with respect to the carrying beam about the longitudinal axis of the second articulation;

in a position other than the set-down position, the lever is retracted in such a way that its longitudinal axis is substantially coincident with the longitudinal axis of the limiter;

the hitching structure includes two lower hitching points and, in the set-down position, the lower hitching point furthest from the cutting mechanism is situated lower down than the lower hitching point closest to said cutting mechanism so as to make the cutting machine easier to hitch to the motor vehicle.

BRIEF DESCRIPTION OF THE DRAWINGS

Other objectives, features and advantages of the invention will emerge from the following description with reference to the appended drawings which represent, by way of nonlimiting example, one embodiment of the cutting machine according to the invention.

In these drawings:

FIG. 3 is a top view of the cutting machine of FIG. 2;

FIG. 4 diagrammatically represents the cutting machine of FIG. 2.

DESCRIPTION OF THE PREFERRED EMBODIMENT

Figure 1:
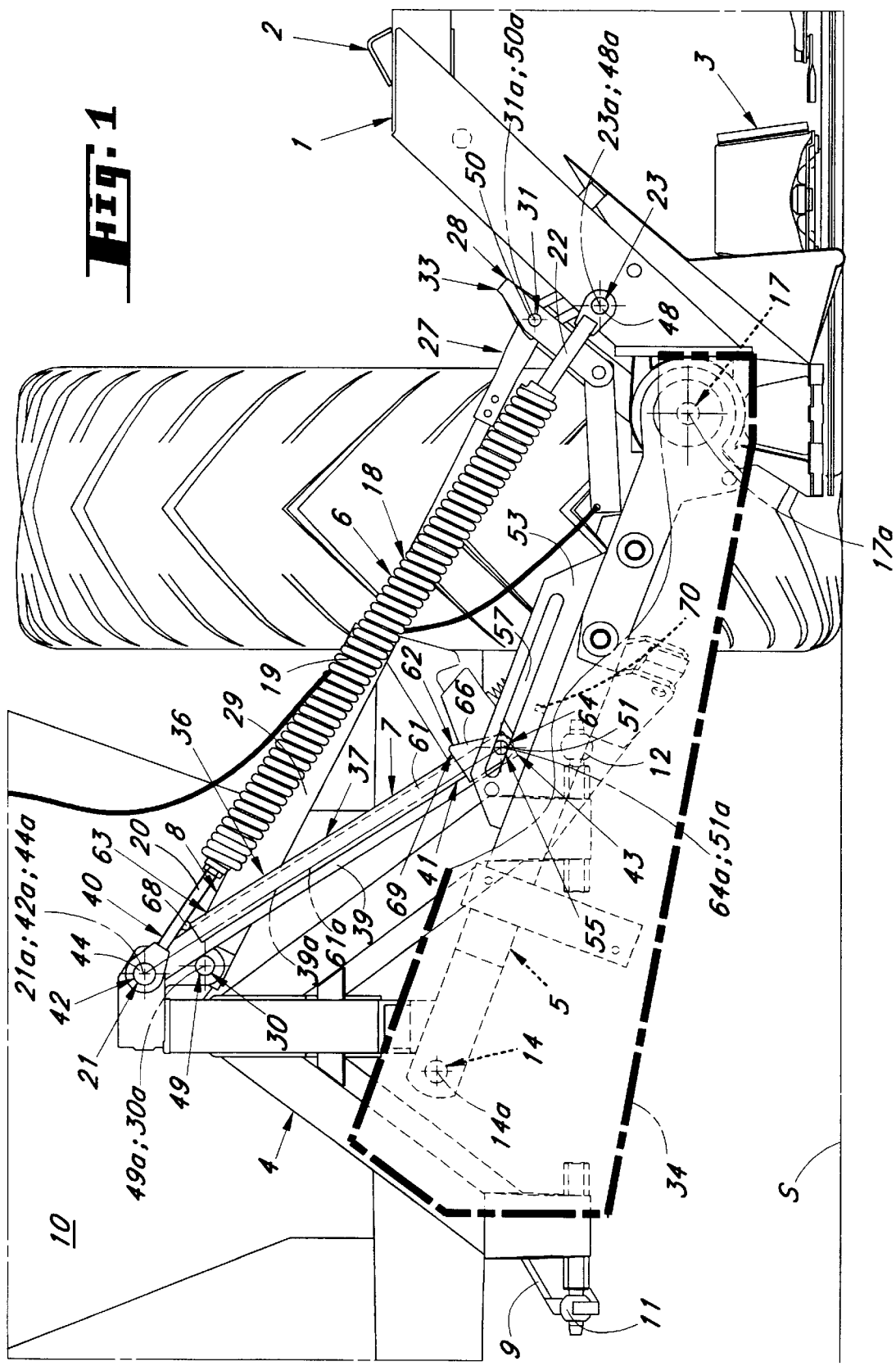
FIG. 1 represents a rear view of a cutting machine according to the invention connected to a motor vehicle and in one of its work positions.

The cutting machine 1 represented in FIGS. 1 to 4 is a mower 2 which basically includes a cutting mechanism 3, a hitching structure 4, a carrying beam 5, a lightening device 6, a locking device 7 and an operating device 8.

The hitching structure 4 is intended to be connected to a hitching device 9 of a motor vehicle 10 by means of two lower hitching points 11, 12 and one upper hitching point 13, all of which form part of said hitching structure 4.

According to the example represented, the cutting mechanism 3 extends, viewed from the rear in the direction of forward travel during work 15 (FIG. 1), to the right of the motor vehicle 10.

The carrying beam 5 is connected on the one hand to the hitching structure 4 by means of a first articulation 14 of longitudinal axis 14a at least substantially horizontal and pointing in the direction of forward travel 15, and on the other hand to the cutting mechanism 3 by means of a second articulation 17 of longitudinal axis 17a at least substantially parallel to said longitudinal axis 14a. In the work position, the carrying beam 5 extends transversely to the direction of forward travel 15.

The lightening device 6 is intended, in the work position, to lighten the cutting mechanism 3 and, in the set-down position, to play a part in holding the hitching structure 4 in an optimum set-down position also making it easy for the mower 2 to be hitched to the motor vehicle 10.

For this purpose, the lightening device 6 includes an elastically deformable element 18 which, in the example represented, is a draw-spring 19. This draw-spring 19 is connected at one of its ends to an upper tie-rod 20 itself connected to the hitching structure 4 by means of a third articulation 21 of longitudinal axis 21a at least substantially parallel to the longitudinal axis 14a of the first articulation 14. At the other of its ends, the drawspring 19 is connected to a lower tie-rod 22 itself connected to the cutting mechanism 3 by means of a fourth articulation 23 of longitudinal axis 23a at least substantially parallel to the longitudinal axis 14a of the first articulation 14.

The operating device 8 makes it possible to bring the cutting mechanism 3 into:

a work position in which said cutting mechanism 3 extends on the one hand substantially at right angles to the direction of forward travel 15 and on the other hand substantially horizontally (work position known as normal (FIG. 1)) or downward or upward (work positions known as special);

a windrowing position in which said cutting mechanism 3 extends above the cut product or product to be cut;

a transport position in which said cutting mechanism 3 extends substantially vertically upward; and a set-down position (FIGS. 2 to 4) in which said cutting mechanism 3 rests longitudinally on the ground S.

This operating device 8 includes an operating element 27 and an operating member 28. According to the example represented, the operating element 27 is a single-acting hydraulic ram 29 connected at one of its ends to the hitching structure 4 by means of a fifth articulation 30 of longitudinal axis 30a and at the other of its ends to the operating member 28 by means of a sixth articulation 31 of longitudinal axis 31a at least substantially parallel to said longitudinal axis 30a. According to the example represented, the operating member 28 includes a three-lever mechanism 33 described in French Patent Application 96 05051 filed on Apr. 17, 1996 by the Applicant company. This operating member 28 will not be described further. For further details reference may, if necessary, be made to the text of said patent application.

The mower 2 additionally includes a transmission device 34 (represented diagrammatically in chain line) intended to transmit the rotational movement of a power take-off (not represented) of the motor vehicle 10 to the cutting mechanism 3 by means of a transmission shaft with universal joints 35.

The locking device 7 for its part basically includes a limiter 36 and a latch 37. The limiter 36 is intended to limit the pivoting of the hitching structure 4 with respect to the carrying beam 5 about the longitudinal axis 14a of the first articulation 14. The latch 37 is intended simultaneously to lock said pivoting of the hitching structure 4 with respect to the carrying beam 5 and the pivoting of said carrying beam 5 with respect to the cutting mechanism 3 about the longitudinal axis 17a of the second articulation 17.

The limiter 36 includes a rigid bar 39 extending, in the work position like in the set-down position, out from the hitching structure 4 downward toward the cutting mechanism 3.

For this purpose, the rigid bar 39 is connected at one 40 of its ends 40, 41 to the hitching structure 4 by means of a seventh articulation 42 of longitudinal axis 42a coincident with the longitudinal axis 21a of the third articulation 21, and at the other 41 of its ends 40, 41 to the carrying beam 5 in a sliding manner by means of a connection 43.

It will be noted that the articulations 21, 42 include, according to the example represented, a common journal 44 of longitudinal axis 44a coincident with the longitudinal axes 21a, 42a. This common journal 44 extends right through the upper tie-rod 20 of the elastically deformable element 18, through the end 40 of the rigid bar 39 and through two flanges 46, 47 of the hitching structure 4, as represented in FIG. 3.

It will also be seen that, according to the example represented, the articulations 23, 30, 31 each include a respective journal 48, 49, 50 of respective longitudinal axis 48a, 49a, 50a coincident with the corresponding longitudinal axis 23a, 30a, 31a of said articulations 23, 30, 31.

The connection 43 for its part also includes a journal 51 of longitudinal axis 51a at least substantially parallel to the longitudinal axis 14a of the first articulation 14 and two flanges 53, 54 rigidly fastened to the carrying beam 5. The ends 55, 56 of the journal 51 are each guided in a respective oblong hole 57, 58 provided in the corresponding flange 53, 54. Each flange 53, 54 lies near the middle part 60 of the carrying beam 5 in such a way that the longitudinal axis 57a, 58a of the corresponding oblong hole 57, 58 extends at least substantially at right angles to the longitudinal axis 14a of the first articulation 14 and that there is a gap between the two flanges 53, 54 carrying said oblong holes 57, 58.

The latch 37 for its part includes a lever 61 extending on the one hand, in the set-down position, substantially parallel to the carrying beam 5 and being connected, on the other hand, at one 62 of its ends 62, 63 to the rigid bar 39 of the limiter 36 by means of an eighth articulation 64 of longitudinal axis 64a coincident with the longitudinal axis 51a of the journal 51.

For this purpose, the other end 41 of the rigid bar 39 and the end 62 of the lever 61 extend into the space provided between the two flanges 53, 54 of the connection 43 so that the journal 51 extends right through:

said other end 41 of the rigid bar 39, two flanges 65, 66 provided at said end 62 of said lever 61, and the oblong holes 57, 58 in said flanges 53, 54, as represented in FIG. 3.

Provided at the other end 63 of the lever 61 is a first bearing surface 68 coming to rest against the cutting mechanism 3 in the set-down position in such a way as to block the upward pivoting of the carrying beam 5 about the longitudinal axis 17a of the second articulation 17.

In the set-down position, the carrying beam 5 extends upward. Provided between the two ends 62, 63 of the lever 61 is a second bearing surface 69. This second bearing surface 69 is intended, in the set-down position, to come to rest against a stop 70 provided between the two flanges 53, 54 of the connection 43 in such a way as to block the hitching structure 4 from pivoting in the direction of the cutting mechanism 3 (that is to say in the clockwise direction) about the longitudinal axis 14a of the first articulation 14.

The second bearing surface 69 according to the example represented is situated on the two flanges 65, 66 of the lever 61, while the stop 70 is fixed on the carrying beam 5 between the two flanges 53, 54 of the connection 43.

Figure 2:
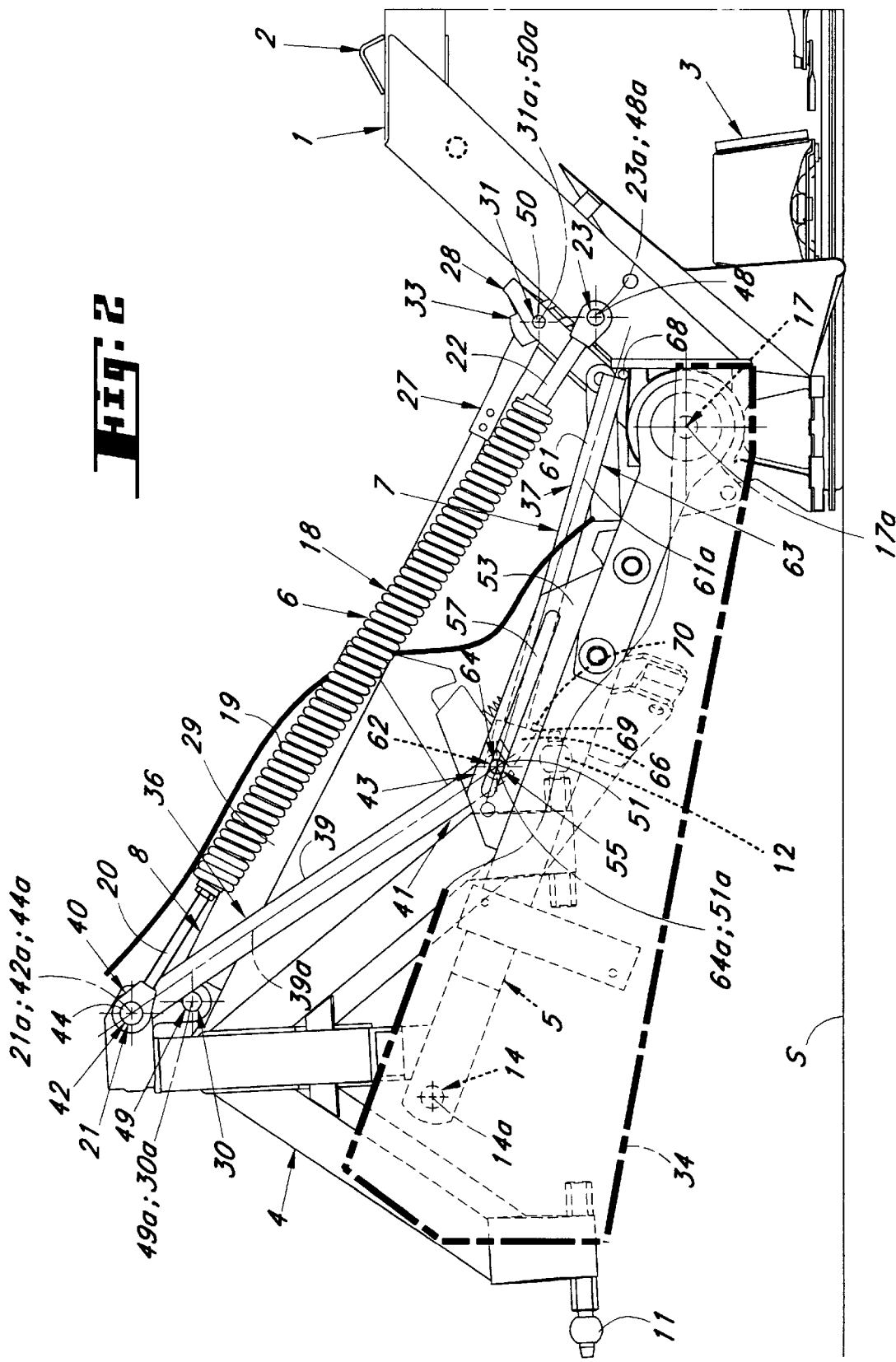
FIG. 2 is a rear view of the cutting machine of FIG. 1 in the set-down position.

In the light of FIG. 2 it may also be seen that the rigid bar 39 of the limiter 36, the lever 61 of the latch 37, the second bearing surface 69 of said lever 61 and the stop 70 are arranged in such a way that in the set-down position, the lower hitching point 11 of the hitching structure 4 furthest from the cutting mechanism 3 is situated lower down than the lower hitching point 12 closest to said cutting mechanism 3 in order to make the mower 2 easier to hitch to the motor vehicle 10.

In the set-down position, the mower 2 rests on the ground S by means of the cutting mechanism 3, and the hitching structure 4 and the carrying beam 5 are especially held in their set-down position as represented in FIGS. 2, 3 and 4 by means of the draw-spring 19 and by means of the locking device 7.

When the operator wishes to hitch the mower 2 to the motor vehicle 10, he connects the hitching structure 4 to the hitching device 9 of the motor vehicle 10 by means of the two lower hitching points 11, 12 and of the upper hitching point 13. In order to do this, it is preferable first of all to connect the lowest lower hitching point 11 to the hitching device 9. The operator then raises the latter a little. Since pivoting about the longitudinal axes 14a, 17a of the articulations 14, 17 is blocked, the mower 2 pivots a little about the end of the cutting mechanism 3 furthest from the hitching structure 4 and this has the effect of bringing the lower hitching point 12 closer to the hitching device 9 allowing it to be connected easily to the latter. Next, the operator connects the upper hitching point 13 to the hitching device 9.

Having connected the three hitching points 11, 12, 13 of the hitching structure 4 to the hitching device 9 of the motor vehicle 10, the operator further raises said hitching device 9 so as to make the cutting mechanism 3 pivot downward about the longitudinal axis 17a of the second articulation 17 in order to move said cutting mechanism 3 off the first bearing surface 68 (if necessary).

Once the lever 61 has been released, the operator retracts said lever 61 in such a way as to free the first and second articulations 14, 17 to allow the hitching structure 4 to pivot with respect to the carrying beam 5 about the longitudinal axis 14a and to allow the cutting mechanism 3 to pivot with respect to said carrying beam 5 about the longitudinal axis 17a. To do this, the operator pivots the lever 61 upward about the longitudinal axis 64a of the eighth articulation 64 as far as a retracted position in which the longitudinal axis 61a of said lever 61 is substantially coincident with the longitudinal axis 39a of the rigid bar 39 of the limiter 36.

Once the mower 2 has been hitched to the motor vehicle 10 and after the operator has lowered the hitching device 9 of said motor vehicle 10, the mower is then in the work position as represented in FIG. 1.

To bring the mower 2 from the work position into the set-down position, the operator will carry out the various operations in reverse order.

It will be noted that the lever 61 occupies its retracted position in the work position, in the windrowing position as well as in the transport position.

Bringing the mower 2 into the windrowing position and into the transport position as well as into the work position from said windrowing and transport positions of the mower 2 takes place in a similar way to the one described in French Patent Application 96 05051 filed on Apr. 17, 1996. These various positionings of the mower 2 will not be described further. For further details reference may if necessary be made to the text of said patent application.

Finally, various modifications remain possible, especially as regards the construction of the various elements or by substituting technical equivalents, without in any way departing from the field of protection defined by the claims.

Thus, it is perfectly possible to envisage the rigid bar 39 of the limiter 36 and/or the lever 61 of the latch 37 being of adjustable length, and/or to envisage the second bearing surface 69 of said lever 61 and/or the stop 70 being adjustable.

It is also perfectly conceivable for the cutting mechanism 3 of the mower 2 to be arranged, viewed from behind in the direction of forward travel 15, to the left of the motor vehicle 10. In such an instance, the various previously-described directions of pivoting would of course be reversed.

What is claimed as new and desired to be secured by Letters Patent of the United States is:

1. A cutting machine including:

a cutting mechanism;

a hitching structure intended to be connected to the hitching device of a motor vehicle;

a carrying beam connected on the one hand to the hitching structure by means of a first articulation and on the other hand to the cutting mechanism by means of a second articulation;

a lightening device including an elastically deformable element connected on the one hand to the hitching structure by means of a third articulation and on the other hand to the cutting mechanism by means of a fourth articulation; and a locking device intended in a transport position to lock on the one hand the pivoting of the hitching structure with respect to the carrying beam about the longitudinal, axis of the first articulation, and on the other hand the pivoting of the cutting mechanism with respect to the carrying beam about the longitudinal axis of the second articulation; and in a set-down position; to lock, at least in one direction, on the one hand the pivoting of the hitching structure with respect to the carrying beam about the longitudinal axis of the first articulation, and on the other hand the pivoting of the carrying beam with respect to the cutting mechanism about the longitudinal axis of the second articulation, such that the hitching structure and the carrying beam are operatively held by means of the elastically deformable element of the lightening device.

2. A cutting machine as claimed in claim 1, wherein the locking device includes a limiter in a work position, intended to limit the pivoting of the hitching structure with respect to the carrying beam about the longitudinal axis of the first articulation.

3. A cutting machine as claimed in claim 2, wherein said limiter is connected, at one end, to the hitching structure by means of an articulation and, at the other end, to the carrying beam in a sliding manner by means of a connection including a journal of longitudinal axis at least substantially parallel to the longitudinal axis of the first articulation, which journal is guided in at least one oblong hole lying at least substantially near the middle part of said carrying beam.

4. A cutting machine as claimed in claim 3, wherein there are provided two oblong holes in which the ends of the journal are guided, and the longitudinal axis of each oblong hole extends at least substantially at right angles to the longitudinal axis of the first articulation.

5. A cutting machine as claimed in claim 3, wherein the locking device includes a latch intended in the set-down position simultaneously to lock the pivoting of the hitching structure with respect to the carrying beam about the longitudinal axis of the first articulation and the pivoting of the carrying beam with respect to the cutting mechanism about the longitudinal axis of the second articulation.

6. A cutting machine as claimed in claim 5, wherein the latch includes a lever connected to the limiter by means of an articulation of longitudinal axis coincident with the longitudinal axis of the journal.

7. A cutting machine as claimed in claim 6, wherein the lever includes a first bearing surface at its other end and a second bearing surface situated between this first bearing surface and the articulation.

8. A cutting machine as claimed in claim 7, wherein, in the set-down position, the first bearing surface of the lever bears on the cutting mechanism.

9. A cutting machine as claimed in claim 7, wherein, in the set-down position, the second bearing surface of the lever bears against a stop provided on the carrying beam.

10. A cutting machine as claimed in claim 9, wherein said stop provided on the carrying beam is situated between the two oblong holes in which the journal is guided.

11. A cutting machine as claimed in claim 10, wherein:

the limiter is of adjustable length and/or the lever is of adjustable length and/or the second bearing surface is adjustable and/or the stop is adjustable.

12. A cutting machine as claimed in claim 6, wherein, in a position other than the set-down position, the lever is retracted.

13. A cutting machine as claimed in claim 12, wherein, in the position other than the set-down position, the lever is retracted in such a way that its longitudinal axis is substantially coincident with the longitudinal axis of the limiter.

14. A cutting machine as claimed in claim 1, wherein the hitching structure includes two lower hitching points and, in the set-down position, the lower hitching point furthest from the cutting mechanism is situated lower down than the lower hitching point closest to said cutting mechanism.

\* \* \* \* \*